United States Patent
Harris et al.

(10) Patent No.: US 12,203,808 B1
(45) Date of Patent: Jan. 21, 2025

(54) ANTI-BLOOMING BUFFERED DIRECT INJECTION PIXELS

(71) Applicant: Raytheon Company, Waltham, MA (US)

(72) Inventors: Micky Harris, Lompoc, CA (US); Angelo Gregory Scott Gilmore, Boulder, CO (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 18/476,769

(22) Filed: Sep. 28, 2023

Related U.S. Application Data

(60) Provisional application No. 63/514,633, filed on Jul. 20, 2023.

(51) Int. Cl.
*G01J 1/44* (2006.01)

(52) U.S. Cl.
CPC ........... *G01J 1/44* (2013.01); *G01J 2001/446* (2013.01)

(58) Field of Classification Search
CPC ................. G01J 1/44; G01J 2001/4406; G01J 2001/446; H01L 27/14649; H01L 27/146; H01L 27/14601; H01L 27/14609; H01L 27/14654; H01L 27/14656; H01L 27/14887; H04N 25/62; H04N 25/623; H04N 25/621; H04N 25/575; H04N 25/571; H04N 25/57; H04N 25/78; H04N 25/778; H04N 25/772; H04N 25/771; H04N 25/77; H04N 25/76; H04N 25/70
See application file for complete search history.

(56) References Cited

U.S. PATENT DOCUMENTS

| | | | | |
|---|---|---|---|---|
| 9,029,770 | B2 * | 5/2015 | Vampola | H04N 25/75 |
| | | | | 250/336.1 |
| 9,191,586 | B2 * | 11/2015 | Minlong | H04N 25/771 |
| 9,497,402 | B2 * | 11/2016 | Lin | H04N 25/77 |
| 11,050,962 | B2 * | 6/2021 | Rhee | H04N 25/75 |
| 2020/0111826 | A1 * | 4/2020 | Boemler | H04N 25/616 |
| 2021/0136306 | A1 * | 5/2021 | Nicolas | H04N 25/75 |

* cited by examiner

*Primary Examiner* — John R Lee
(74) *Attorney, Agent, or Firm* — CANTOR COLBURN LLP

(57) ABSTRACT

A pixel disclosed includes an anti-blooming injection transistor (DI) transistor under the control of a BDI amplifier/transistor combination. The "turn on" of the anti-blooming injection transistor is offset from the turn on of the BDI transistor by an offset. When the offset is overcome, excess charge can be diverted (iDiverted) away from an integration capacitor. This can allow the BDI transistor/amplifier combination to hold the detector at nominal bias over an extended range and may reduce blooming. The pixel can be implemented in manner that adds a second transistor and a capacitor to prior BDI designs.

15 Claims, 2 Drawing Sheets

ANTI-BLOOMING BUFFERED DIRECT INJECTION PIXELS

CROSS-REFERENCE TO RELATED APPLICATIONS

This application claims the benefit of U.S. Application No. 63/514,633 filed Jul. 20, 2023, the disclosure of which is incorporated herein by reference in its entirety.

BACKGROUND

The present disclosure relates to a digital pixel imager and, in particular, a digital pixel circuit that utilizes a buffered direct injection amplifier to control detector current.

In legacy analog imagers, particularly infrared imagers, photo-current from a detector (e.g, a diode) is integrated by a well capacitor coupled to the detector diode. At the end of a frame, the voltage or charge of the well capacitor is transferred to a down-stream analog-to-digital converter (ADC), where the voltage is converted to a binary value. Pixel sizes continue to shrink and the ratio of well capacitor to pixel area shrinks disproportionately more. Simultaneously, there is a demand by consumers for increased Signal-to-Noise Ratio (SNR) which can be realized by increasing effective well capacitance.

One type of in-pixel ADC circuit utilizes a direct injection (DI) transistor. In such a circuit charge from a photo-diode is accumulated over an integration capacitor. Charge is accumulated, in general, until a readout time. When that time is reached, the charge stored in integration capacitor is provided to a readout circuit. Such circuits can be either integrate then read or read while integrating circuits.

Control of the flow of current from the photo-diode is controlled by the injection transistor. The gate of the injection transistor is coupled to a bias voltage. The level of this voltage can be selected by the skilled artisan and is used, in part, to keep the photo-diode in reverse bias.

Another type of in-pixel circuit utilizes an injection transistor where the bias voltage is controlled by an amplifier that provides negative feedback to the gate voltage of the injection transistor. Such an in-pixel circuit is referred to as a buffered direct injection (BDI) circuit or cell. A BDI pixel is commonly used to prevent de-biasing of the photodiode for high dynamic range scenes containing areas with high flux. That is, the amplifier can keep the reverse bias across the photodiode constant, independent of photocurrent.

SUMMARY

Disclosed is a pixel that includes: a photo-current source and a buffered direct injection integration network that includes an input node coupled to the photo-current source; and an amplifier having first and second inputs and an output. The pixel also includes an anti-blooming circuit coupled between the output of the amplifier and the input node. The anti-blooming circuit includes an anti-blooming injection transistor including an input terminal connected to the input node, an output terminal and a gate as well as an offset capacitor connected between the output of the amplifier and the gate of the anti-blooming injection transistor. The offset capacitor is configured to store a charge and provide a first voltage to the gate of the anti-blooming injection transistor causing the anti-blooming injection transistor to divert an excess current away from the node when a voltage at the output of the amplifier drops below a diversion threshold.

In any embodiment disclosed herein the pixel can further include: a readout circuit.

In any embodiment disclosed herein, wherein the buffered direct injection integration network can further include an injection transistor coupled the input node and an integration capacitor coupled between the second injection transistor and a reference voltage.

In any embodiment disclosed herein the second input of the amplifier can be connected to the input node and the output is coupled to a gate of the second injection transistor.

In any embodiment disclosed herein the anti-blooming injection transistor becomes conductive after the injection transistor become conductive.

In any embodiment disclosed herein the anti-blooming injection transistor diverts the excess current when the injection transistor cannot pass additional current.

In any embodiment disclosed herein the amplifier can be either a common source amplifier or a differential amplifier.

In any embodiment disclosed herein the first input is a positive input and the second input is an inverting input.

In any embodiment disclosed herein the first input can be a diode bias voltage.

In any embodiment disclosed herein the diode bias voltage can be a global voltage that is applied to photo-current sources of other pixels.

In any embodiment disclosed herein the pixel can include a reset switch coupled in parallel with the integration capacitor.

Also disclosed is a method of operating a buffered direct injection pixel. The method includes: during a normal operating mode controlling a gate voltage of an injection transistor with the output of an amplifier to control a bias of photo-current source; operating in the normal operating mode until the output of the amplifier falls below a level where it can cause the injection transition to become more conductive; and diverting current from the first injection transistor through an anti-blooming injection transistor.

In any embodiment disclosed herein wherein the anti-blooming injection transistor can be part of an anti-blooming circuit coupled between the output of the amplifier and an input node defined between photo-current source and the first injection transistor.

In any embodiment disclosed herein a anti-blooming injection transistor includes an input terminal connected to the input node, an output terminal and a gate and the anti-blooming circuit includes: an offset capacitor connected between the output of the amplifier and the gate of the anti-blooming injection transistor.

In any embodiment disclosed herein the method can further include: storing a charge on the offset capacitor such the anti-blooming injection transistor becomes conductive after the injection transistor become conductive so that the anti-blooming injection transistor diverts current away from the input node.

In any embodiment disclosed herein the first input is a positive input and the second input is an inverting input.

In any embodiment disclosed herein the first input can be a diode bias voltage.

In any embodiment disclosed herein the diode bias voltage can be a global voltage that is applied to photo-current sources of other pixels.

In any embodiment disclosed herein the method can further include resetting the integration capacitor.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

A digital pixel focal plane has a linear relation with power dissipated and flux applied on the detector. The following disclosure is based at least in part on the discovery that in some extremely bright scenes the pixel will stop responding due to over saturation of the input circuits. To that end, a pixel is provided that may limit the input current resulting from the detector exposure to light, solving both power dissipation runaway and failure to respond to super bright targets that result in aliasing.

In general, the pixel disclosed herein includes a secondary direct injection (DI) transistor under the control of the BDI amplifier/transistor combination. The "turn on" of the secondary DI transistor is offset from the turn on of the BDI transistor by an offset. When the offset is overcome, the excess charge can be diverted (iDiverted below) away from the integration capacitor. This can allow the BDI transistor/amplifier combination to hold the detector at nominal bias over an extended range and may reduce blooming. In one embodiment, the pixel can be implemented in a manner that adds a second transistor and a capacitor to prior BDI designs.

Figure 1:
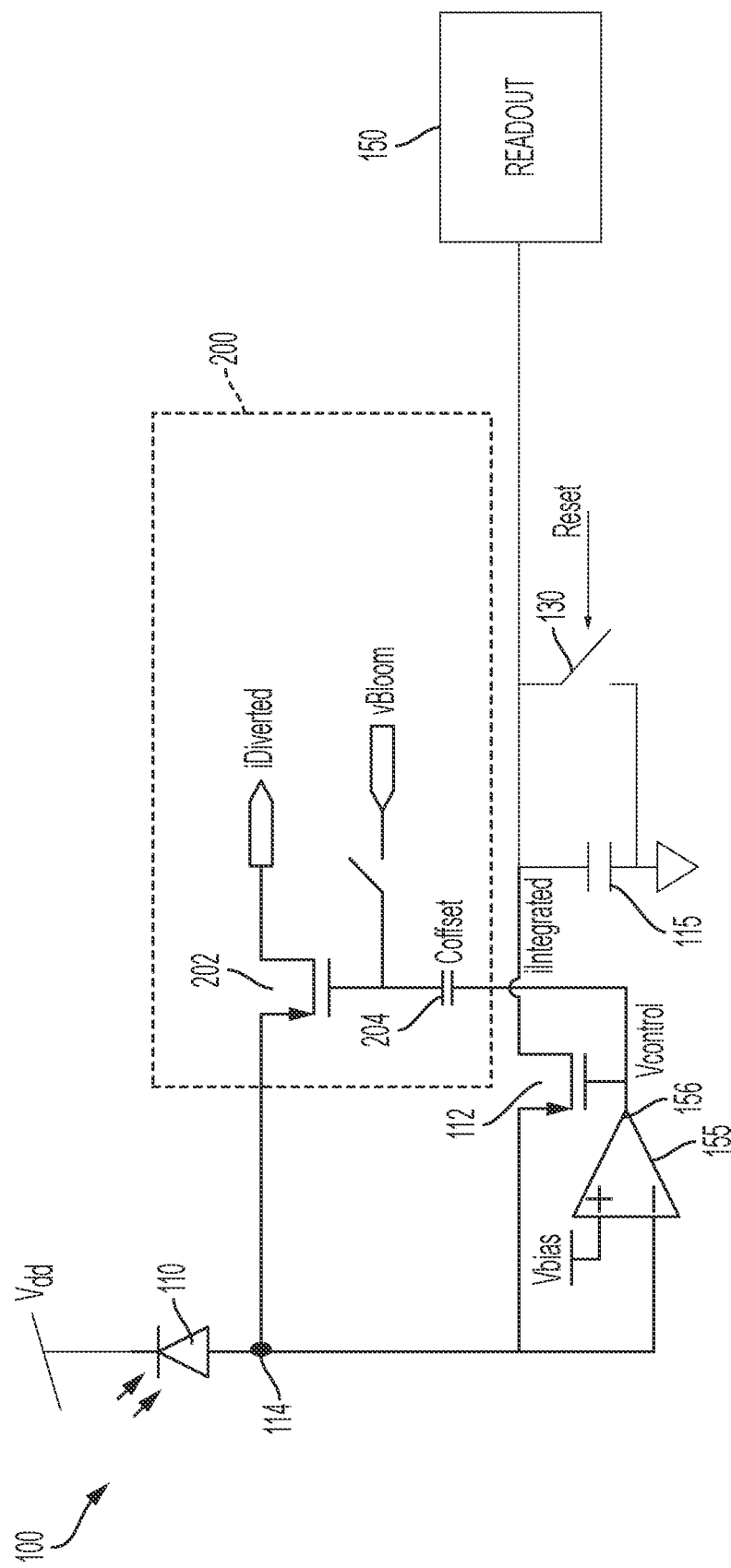
FIG. 1 is a schematic diagram illustrating a BDI cell according to one embodiment during normal operation.

FIG. 1 shows a BDI pixel 100 according to one embodiment and including a detector and a buffered direct injection integration network.

The detector 110 can be referred to as a photo-diode or photo-current source herein.

The BDI integration network can include an input node 114, an injection transistor 112, an integration capacitor 115, an amplifier 155, and a reset switch 130. During normal operation (e.g, when the detector 110 is exposed light of normal or "not bright" intensity) charge from the detector 110 is accumulated over the integration capacitor 115. Charge is accumulated, in general, until a readout time. When that time is reached, the charge stored in integration capacitor 115 is provided to a readout circuit generally shown as readout 150. The capacitor 115 can then be reset by closing the reset switch 130 upon receipt of a Reset signal.

Control of the flow of current from the detector 110 is controlled by the injection transistor 112. The gate of the injection transistor 112 is coupled to an injection transistor control voltage ($V_{control}$). This control voltage will define the $V_{gs}$ for the injection transistor 112 (DI transistor from time to time herein). The level of this voltage can be selected by the skilled artisan and is used, in part, to keep the detector 110 in reverse bias where the voltage at node 114 is lower than the detector supply voltage $V_{dd}$. The value will be based on a comparison with a selected bias voltage (Vbias)

In operation, the value of $V_{control}$ (and thus, $V_{gs}$) is controlled by an amplifier 155. The amplifier 155 is differential amplifier in one embodiment. The positive input of the amplifier 155 can be connected to a pixel bias voltage Vbias. Vbias can be global voltage that is applied to photo-current sources of other pixels or it can be pixel specific for each pixel in an array (or some combination thereof). The negative input can be connected to node 114. In operation, the value of $V_{control}$ will decrease as the voltage at node 114 increases. Stated differently, as the detector 110 generates more charge due to exposure to an energy source (e.g., light), $V_{control}$ will be adjusted to keep the voltage at node 114 at or near a desired level. In practice, such variations will cause the injection transistor 112 to allow more current to pass to keep the detector 110 in a reversed biased state as the intensity of the energy source increases and vice-versa.

However, in some instances, the amount of current that needs to be passed can exceed by limits of combination of amplifier 155/DI transistor 112. In short, when the gate of the DI is driven to or near "0" (e.g., $V_{control}$ drops to a value at or near 0), the DI transistor 112 will not be able to pass any additional current and, thus, pixel blooming can occur.

To overcome this issue, an anti-blooming circuit 200 is provided. The anti-blooming circuit 200 diverts excess current that cannot pass through the DI transistor 112. This excess current is denoted as iDiverted in FIG. 1 and is diverted from the node.

The anti-blooming circuit 200 includes a second or anti-blooming DI transistor 202 that has its gate controlled by a signal related to $V_{control}$. As discussed below, when $V_{control}$ falls below and a diversion threshold. In particular, the gate of the anti-blooming DI transistor 202 is controlled by a voltage that is the sum of $V_{control}$ and an offset voltage ($V_{offset}$) stored in an offset capacitor 204. As shown, the anti-blooming DI transistor 202 has an input terminal 210, an output terminal 212 and a gate 214. The input terminal 210 is connected to node 114. The gate 214 is connected to offset capacitor 204. The offset capacitor 204 is also connected to the output 156 of the amplifier 155.

Figure 2:
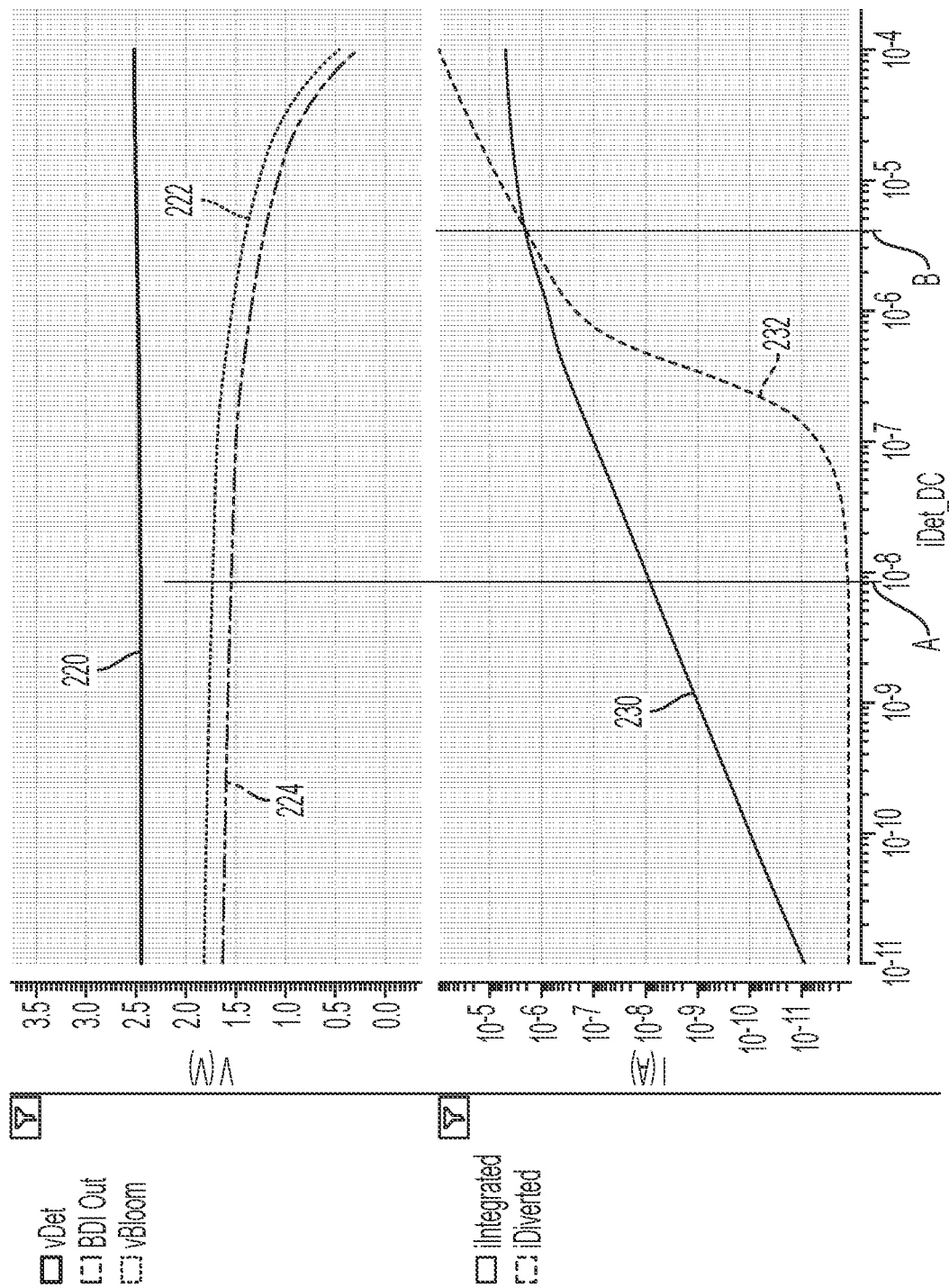
FIG. 2 is a schematic diagram illustrating a BDI cell of FIG. 1 during an auto null phase.

A working example is now provided with respect to FIGS. 1 and 2. FIG. 2 shows example currents/voltages at various locations. In FIG. 2, trace 220 shows the voltage at node 114 as the current from the detector 110 (the current entering node 114) increases and may be referred to as vDet. Trace 222 shows the voltage at the gate of the second DI transistor 202 (e.g., vBloom) as the current from the detector rises. Trace 224 shows the voltage as the current from the detector rises at output 156 of the amplifier (e.g, $V_{control}$). Also in FIG. 2, traces 230 and 232, respectively show iIntegrated and iDiverted as the current from the detector rises.

Assume that detector voltage at node 114 is high and would otherwise lead to blooming. To handle this voltage, the amplifier 155 will increase Vgs of the first DI transistor to increase current flow (e.g., iIntegrated) though the first DI transistor 112. As shown, reducing Vcontrol will increase Vgs of the DI transistor 112. This can continue until the amplifier output increases Vgs to a level where the voltage provided to the gate of the anti-bloom DI transistor 202 is such that it becomes conductive. That is, the sum of $V_{control}$ and the voltage stored in the offset capacitor 204 is provided to the gate of the anti-bloom DI transistor 202.

As the output of the amplifier falls, the voltage at the gate of the anti-bloom DI transistor 202 falls. When the voltage at the gate of the anti-bloom DI transistor 202 is low enough (that is, below a diversion threshold), Vgs of the anti-bloom DI transistor 202 will be in a state where the anti-bloom DI transistor 202 becomes conductive and diverts current (iDiverted). This current can be diverted from the node 114 and, thus, away from the DI transistor 112 This "opening" of the anti-bloom DI transistor 202 is noted by the vertical line A in FIG. 2. As can be seen in FIG. 2, after the anti-bloom DI transistor 202 is fully opened (e.g., at line B), iIntegrated slows/stops increasing and iDiverted increases. This can reduce or more effectively manage power runaway in digital pixels by controlling the maximal value of iIntegrated.

As noted above, the difference between traces 222 and 224 is roughly the voltage stored in the offset capacitor. This voltage can be reset every frame by applying a voltage at location indicated by vBloom in FIG. 1.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the present disclosure.

What is claimed is:

1. A pixel comprising:
   a photo-current source;
   a buffered direct injection integration network comprising:
      an input node coupled to the photo-current source;
      an amplifier having first and second inputs and an output; and
      an anti-blooming circuit coupled between the output of the amplifier and the input node, the anti-blooming circuit comprising:
         an anti-blooming injection transistor including an input terminal connected to the input node, an output terminal and a gate; and
         an offset capacitor connected between the output of the amplifier and the gate of the anti-blooming injection transistor;
         wherein the offset capacitor is configured to store a charge and provide a first voltage to the gate of the anti-blooming injection transistor causing the anti-blooming injection transistor to divert an excess current away from the input node when a voltage at the output of the amplifier drops below a diversion threshold.

2. The pixel of claim 1, further comprising;
   a readout circuit; and
   wherein the buffered direct injection integration network further comprises:
      an injection transistor coupled the input node; and
      an integration capacitor coupled between the injection transistor and a reference voltage, and
      wherein the second input of the amplifier is connected to the input node and the output is coupled to a gate of the injection transistor.

3. The pixel of claim 2, wherein the anti-blooming injection transistor becomes conductive after the injection transistor becomes conductive.

4. The pixel of claim 2, wherein the anti-blooming injection transistor diverts the excess current when the injection transistor cannot pass additional current.

5. The pixel of claim 1, wherein the amplifier is either a common source amplifier or a differential amplifier.

6. The pixel of claim 5, wherein the first input is a positive input and the second input is an inverting input.

7. The pixel of claim 1, wherein the first input is a diode bias voltage.

8. The pixel of claim 7, wherein the diode bias voltage is a global voltage that is applied to photo-current sources of other pixels.

9. The pixel of claim 1, further including a reset switch coupled in parallel with the integration capacitor.

10. A method of operating a pixel that includes: a photo-current source; a buffered direct injection integration network comprising: an input node coupled to the photo-current source; an amplifier having first and second inputs and an output; and an anti-blooming circuit coupled between the output of the amplifier and the input node, the anti-blooming circuit comprising: an anti-blooming injection transistor including an input terminal connected to the input node, an output terminal and a gate; and an offset capacitor connected between the output of the amplifier and the gate of the anti-blooming injection transistor; wherein the offset capacitor is configured to store a charge and provide a first voltage to the gate of the anti-blooming injection transistor causing the anti-blooming injection transistor to divert an excess current away from the input node when a voltage at the output of the amplifier drops below a diversion threshold, the method comprising:
   during a normal operating mode controlling the gate voltage of the anti-blooming injection transistor with the output of the amplifier to control a bias of photo-current source;
   operating in the normal operating mode until the output of the amplifier falls below a level where it can cause the anti-blooming injection transition to become more conductive; and
   diverting current from the input node through the anti-blooming injection transistor.

11. The method of claim 10, wherein the pixel further includes:
   an injection transistor coupled the input node; and
   an integration capacitor coupled between the injection transistor and a reference voltage, wherein the second input of the amplifier is connected to the input node and the output is coupled to a gate of the injection transistor;
   the method further comprising:
   storing a charge on the offset capacitor such that the anti-blooming injection transistor becomes conductive after the injection transistor becomes conductive so that the anti-blooming injection transistor diverts current away from the input node.

12. The method of claim 11, wherein the first input is a positive input and the second input is an inverting input.

13. The method of claim 12, wherein the first input is a diode bias voltage.

14. The method of claim 13, wherein the diode bias voltage is a global voltage that is applied to photo-current sources of other pixels.

15. The method of claim 14, further including resetting the integration capacitor.

\* \* \* \* \*